United States Patent Office 3,452,121
Patented June 24, 1969

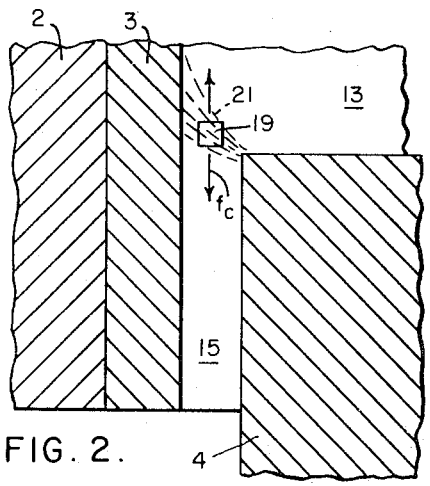
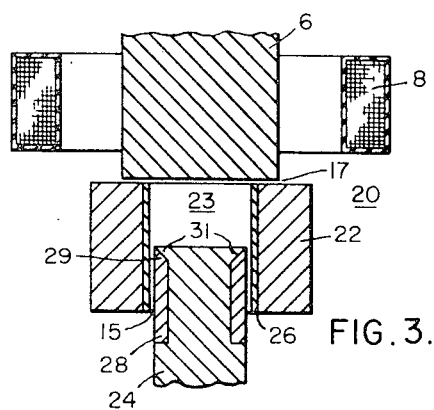
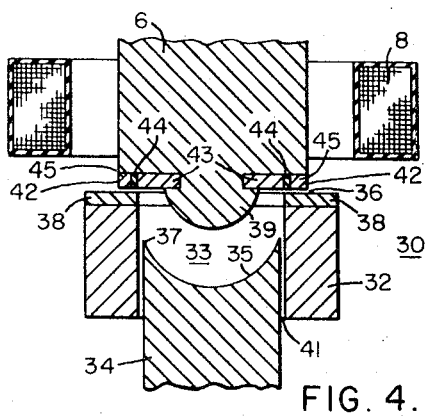
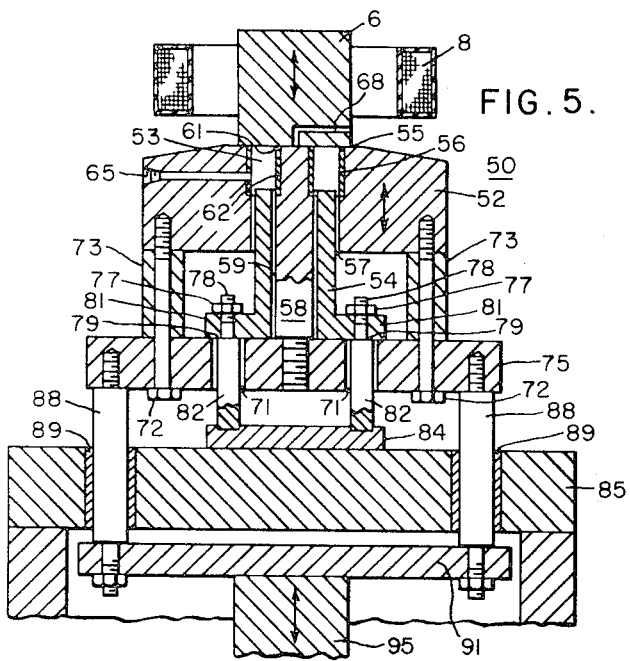
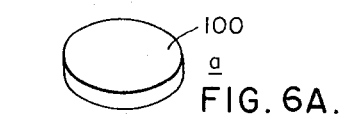
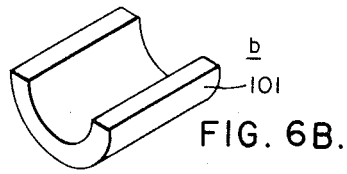
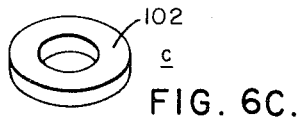

3,452,121
APPARATUS AND PROCESS FOR FORMING OR MOLDING MAGNETIC SUBSTANCES
Alexander W. Cochardt, Export, and Joseph Buttyan, Wilkins Township, Pittsburgh, Pa., assignors to Westinghouse Electric Corporation, Pittsburgh, Pa., a corporation of Pennsylvania
Continuation of application Ser. No. 560,320, June 24, 1966. This application Mar. 11, 1968, Ser. No. 712,308
Int. Cl. B22f 9/00, 3/00
U.S. Cl. 264—24        11 Claims

ABSTRACT OF THE DISCLOSURE

A process and apparatus for forming ferromagnetic compacts from mixtures of ferromagnetic particles and liquids without the use of separate porous filtering elements is described. Restricted filtering paths are provided for the removal of liquid during compaction and means are provided for establishing a region of high magnetic field gradient adjacent the entrances to the filtering paths to restrain the ferromagnetic particles from flowing into the filtering paths thereby forming a filtering mat of ferromagnetic particles adjacent the entrance to the filtering path.

---

This application is a continuation of application Ser. No. 560,320 filed June 24, 1966, and now abandoned.

This invention relates to an improved filtering method and apparatus for the molding of ceramic magnetic materials.

While there are many methods for forming ceramic materials, in the ceramic magnetic field with which this invention is concerned only the process of forming in a die under pressure has commercial significance. Further, in the manufacture of high energy oriented permanent ferrite magnets, compaction in a magnetic field to obtain orientation of the magnet particles is the conventional process. In this process, as it is commonly practiced, a die is filled with a ceramic ferrite slurry and pressure is exerted by a ram member on the slurry confined in the die, whereby the fluid component of the slurry is forced out through appropriate fibrous or porous filters and escapes from the die chamber through channels, while the solid components of the slurry is compacted to the desired shape. This conventional method has been described in several publications and is shown, for example, in U.S. Patent No. 3,019,505, dated Feb. 6, 1962. A solid particle-liquid mixture as, for example, a slurry, is necessary if optimum magnetic properties are to be obtained, because such solid particle-liquid mixture allows the magnetic particles to rotate and become aligned in the magnetic field during the pressing operation. Oriented ferrite magnets provide optimum properties for many applications.

This conventional method has the disadvantage that it does not lend itself readily to automation. Several operations which must be carried out by hand are required. Thus, one or two filters are placed by hand on the liquid escape channels in the plungers of the die assembly before the start of the pressing cycle. Further, at the end of the pressing cycle, the filters must be separated by hand from the pressed magnets.

The conventional method of pressing also has the disadvantage that a clean filter must be provided for every magnet pressed. It has been found that a cellulose paper filter can be used only once and then must be disposed of, while a nylon fiber filter must be washed after each pressing operation. Further, the filters quite often must be cut to fit the particular die being used.

Still another disadvantage of the conventional method of pressing is the fact that the texture of the filter is impressed into the magnet faces in the course of the pressing operation. Where magnets with smooth faces are desired, an expensive grinding operation is required to remove the impression of the filter from the magnet faces.

Accordingly, it is an object of the present invention to provide an apparatus and method for pressing magnetic particles from a solid particle-liquid mixture wherein the separate fibrous or porous filter element is not required.

It is another object of this invention to provide an apparatus and method for pressing magnetic particles into compacts from a solid particle-liquid mixture which readily lends itself to automation.

It is still another object of this invention to provide an apparatus and method for filtering magnetic particles through narrow orifices wherein a filter mat is formed at the orifices by a magnetic field which permits separation of the magnetic particles from the fluid medium.

Yet another object is to provide a novel die structure whereby high magnetic field gradients may be provided adjacent filtering paths through the die structure so that filter mats are formed in the magnetic field thereby permitting separation of the magnetic particles from the fluid medium.

Other objects of the invention will, in part, be obvious and will, in part, appear hereinafter.

For a better understanding of the nature and objects of the invention, reference should be had to the following detailed description and to the drawings, in which:

FIGURE 1 is a sectional view of a portion of a die and press structure in accordance with this invention;

FIG. 2 is an enlarged view of a portion of FIG. 1 in the filtering area;

FIG. 3 is a view in cross-section of an alternative die and press structure in accordance with this invention;

FIG. 4 is a view in cross-section of an alternative arrangement of the die and press structure in accordance with this invention which is particularly adapted to the production of magnetic arc segments;

FIG. 5 is a sectional view of a die and press structure particularly adapted for making ring magnets wherein a substantial part of the associated press structure is shown so that the pressing operation may be more readily understood; and FIGS. 6A, 6B and 6C illustrate three magnet shapes made by the dies of FIGS. 1, 4 and 5, respectively.

As employed in this application, the term "solid particle-liquid mixture" embraces mixtures of ferromagnetic particles with a liquid or fluid medium having widely varying proportions of solid to liquid. Thus, a mixture with a relatively low ratio of solid to liquid may have a relatively high fluidity. Such a mixture may be poured from vessel to vessel, pumped and treated generally much like a liquid. A mixture with a higher ratio may resemble a paste in its consistency and the required handling techniques. A mixture with a still higher solid-to-liquid ratio may be susceptible to shaping in a mold or die and capable thereafter of retaining its shape in the manner of clay or a moist "mud-cake." It has been found that in all of the above forms of the "solid particle-liquid mixture" the individual ferromagnetic particles have sufficient mobility to rotate into alignment with the magnetic field as required in the process.

The process and apparatus described herein are useful in the production of oriented ferrite compacts from a solid particle-liquid mixture; the improvement achieved in the structure of the invention is the establishment of regions of high magnetic field gradient adjacent the entrance to filtering paths or channels whereby separation of the fluid and solid components of the solid particle-liquid mixture can be secured without the use of separate filtering elements. While the invention is described principally with a press and die structure for molding individual compacts in mind, the invention is readily adaptable to extrusion presses as well.

Referring to FIG. 1, a structure is shown therein which is an embodiment of the invention in a relatively simple form. Thus, the die assembly 10 includes a non-magnetic die body 2 having a die cavity 13 therein. The die body 2 has a thin liner 3 of ferromagnetic material fixed therein which constitutes the wall of the die cavity 13. A lower ram 4 formed of ferromagnetic material is fixed for reciprocation relative to the die body 2 into the die cavity 13. While the lower ram 4 has a relatively close fitting relationship with the cavity liner 3, there is some small clearance of the order of several mils which provides a filtering path 15 for escape of liquid between the cavity liner 3 and the lower ram 4. The clearance between the liner 3 and the ram 4 is, of course, exaggerated in FIG. 1. The upper ram 6 abuts the upper surface of the die body 2. Between the abutting surfaces of the upper ram 6 and the die body 2 conventional machining irregularities provide a second filtering path 17 for fluid under pressure about the upper end of the die cavity 13. It is desirable that these abutting surfaces not be ground or finished too smoothly. Surrounding the upper ram 6 is a coil 8 for producing a magnetic field in the die cavity 13.

In operation, the press and die assembly of FIG. 1 functions in the following manner: In the loading position, the lower ram 4 is positioned within the die cavity 13 to close the bottom of the die cavity. The solid particle-liquid mixture of magnetic material is poured, pumped, extruded or dropped into the die cavity 13. Depending upon the filling technique, the upper ram 6 may either be in a raised position separated from the die body 2 to permit pouring into the top of the die cavity, or in contact with the die body in which case the die cavity is filled through a passage 11 in the die body (shown in dotted lines in FIG. 1).

After the die cavity is filled, and, if required, the ram 6 is lowered into contact with the upper surface of the die body 2, the coil 8 is energized to establish a magnetic field within the closed die cavity 13. The lower ram 4 is simultaneously moved upwardly into the die cavity to force the liquid component of the ferromagnetic mixture along the filtering paths 15 and 17 and to compact the solid component of the mixture. During this portion of the operation, the magnetic field established in die cavity 13 by the coil 8 operates to orient the particles with respect to the magnetic field. Due to the construction of the ferro-magnetic and non-magnetic portions of the die and press components, regions of high magnetic field gradient are established at the top surface of the lower ram member 4 between the circumferential edge of the ram member 4 and the ferro-magnetic liner 3 in the die body 2, and between the bottom surface of the upper ram member 6 and the adjacent ferromagnetic liner in the die body. Particles of the solid component of the ferromagnetic mixture are initially trapped and held in these high field gradient regions and a buildup of ferromagnetic particles ensues until a point is reached at which the mechanical friction of the particles forms a self-sustained mat-like body at these regions which is capable of preventing the flow of solid particles along the filtering paths 15 and 17 despite high compacting pressures. A compact made in the die and press structure of FIG. 1 is shown in FIG. 6A.

A greatly enlarged view of a region in which a filter mat is to be established is set forth in FIG. 2. In the area defined by the curves 21, between the sharp edge of the upper surface of the lower ram 4 and the ferromagnetic insert 3, there is a very high field gradient established which is due to the sharp corner at the edge being located near the smooth surface of insert 3. A magnetic particle such as the conventionalized cube shaped particle 19 shown in FIG. 2 is subjected to two forces, as a first approximation. The force $f_c$ is the conventional mechanical force which is imparted by the action of the press:

$$f_c = Ap$$

where $A$ is the area of the particle perpendicular to $f_c$ and where $p$ is the mechanical pressure. The other force, acting in the opposite direction, is the unconventional, magnetic force $f_m$ which is given by the relation $$f_m = VM dH_i/du_i$$

where $V$ and $M$ are, respectively, the volume and the saturation magnetization of the magnetic particle and where $dH_i/du_i$ is the component of the field gradient in the $u$-direction (straight upward in FIG. 2).

In addition to these two forces, there is a third force, a friction force, which is acting in the same direction as force $f_m$. This friction force initially is low and can be neglected at the start of the pressing operation when the liquid component of the solid particle-liquid mixture is relatively great in volume at the entrance to the filtering path 15, as more and more solid particles jam into path 15. The friction force becomes very large during the latter stage of the pressing operation when the liquid component is reduced in volume and the solid particles are locked in contact with each other and with the die and ram surfaces. Thus, the friction force is much larger than the force $f_m$ when an appreciable amount of magnetic material is matted at the entrance of filtering path 15. During this terminal stage of the pressing cycle, the friction force helps prevent the escape of the magnetic particles through the filtering path 15.

The invention resides in the surprising finding that at the start of the pressing cycle, when the friction force is essentially zero, no significant amount of magnetic particles escape through the filtering path 15 if the magnetic gradient is sufficiently large, and if the magnetic particle is sufficiently long in its direction of magnetization. The condition for retention of the magnetic particle in the die cavity is given by $$f_m \geq f_c$$

or $$L \, dH_i/du_i \geq p/M$$

where $L$ is the length of the particle in its direction of magnetization. The relationship expressed by this last equation has been confirmed by experimental results. As a consequence, the magnetic filtering action of the invention can be controlled by properly choosing the quantities set forth in that equation. For example, if magnetoplumbite ferrite magnets are to be employed, for which $M=360$ gauss, and if the applied mechanical sealing pressure (the initial pressure before the friction force builds up) is $10^4$ dynes/cm.$^2$, the product $L dH_i/du_i$ will have to be at least approximately $$L dH_i/du_i = 30 \text{ cm.} \times \text{oe./cm.}$$

for obtaining the proper magnetic filtering action according to the method of the invention. This means that when a field gradient of 6000 oe./cm. is provided, the length $L$ of a magnetic particle in its direction of magnetization will have to be at least 50 microns. Such relatively large particles, and particles of even larger size, may be provided by prepressing large magnets using conventional filter pressing, firing these large magnets and crushing and milling them to a coarse powder having a relatively large average particle size. Each of these relatively large particles will then essentially be a single crystal. As discussed below, one unexpected aspect of the invention is that only a relatively small proportion of large particles of ferrites is needed to initiate the formation of the magnetic filter mat at the entrance to a filtering path.

A particularly strong field gradient, and therefore especially powerful magnetic filtering action is obtained when sharp knife-like ferromagnetic edge portions are provided on the ram 24 as shown in FIG. 3. The structure of FIG. 3 is quite similar to that of FIG. 1 except that a cylindrical non-magnetic insert 28 has been provided about the circumference of the bottom plunger 24. At the upper end of the non-magnetic insert 28, there is provided a beveled portion 29 thereon. The upper edge of the lower ram 24 is thus formed into a knife-like edge of the magnetic material which closely approaches the magnetic liner or insert 26 in the die body 22. Due to this knife edge, the magnetic field gradient in the gap between the lower ram 24 and the magnetic insert 26 and the die body is greatly intensified and therefore a powerful magnetic filtering action is obtained.

Another structural arrangement of a die assembly in which particularly strong field gradients and especially powerful magnetic filtering action is obtained, is shown in FIG. 4, in which magnets with a radial orientation are formed. In the die assembly 30 there is a sharp knife edge 37 on the magnetic bottom ram 34 which provides a field gradient of the order of 10,000 oersteds per centimeter. The lower ram member 34 has a concave upper surface which cooperates with the convex portion 39 of the upper ram member 6. The upper ram member 6 is composed of a highly ferromagnetic material such as iron and has a composite ring insert 42 forming a pair of shoulders adjacent the convex portion 39. The composite ring insert 42 is formed of three concentric ring elements which are secured together by any suitable means such as shrink fitting to form a single unit. The innermost ring element 43 is non-magnetic, the intermediate ring element 44 is magnetic and the outermost ring element 45 is non-magnetic. The die body 32 is non-magnetic as in the previously described structures with an insert or plate 38 of ferromagnetic material forming the top surface thereof. The magnetic plate 38 abuts the composite ring insert 42 in the upper ram 36 when the die press structure is in the closed position. Filtering path 36 lies between plate 38 and the composite ring insert 42. Filtering path 41 is provided between ram member 34 and the die body 32. Regions of high magnetic field gradient are established at the entrance to the filtering paths when the coil 8 is energized between the knife edges 37 of the lower ram member 34 and the magnetic plate 38 on the die body 32, and between the inside edge of plate 38 and the intermediate magnetic ring 44 of the composite ring insert 42. A magnetic compact made in the die assembly of FIG. 4 is illustrated in FIG. 6B.

In FIG. 5, there is shown a commercial embodiment of the apparatus for pressing magnet rings. The die assembly is shown generally at 50 and comprises a die body 52 having a circular die cavity 53 therein which is open at the top and bottom thereof. The die body 52 has a thin-walled cylindrical ferromagnetic die insert 56 lining the die cavity 53. A die spindle 58 extends into the die cavity 53 as a mandrel to provide the central hole of the ring-shaped magnet. The portion of the spindle which is in the die cavity has a thin-walled cylindrical insert 62 which forms the inner wall of the die cavity 53. The main spindle structure is formed from non-magnetic material. As in the structures previously described, an upper ram member 6 abuts the upper surface of the die member 52 for closing the die cavity 53 at the upper end thereof. In this embodiment the upper ram member 6 may be provided with a vacuum passage 68 between the bottom surface and the side wall of the ram for removal of fluid at the said ram surface. The die body 52 is supported in fixed relation to the die base 75 by bolts 72 which extend through spacing members 73. Secured to the die base 75 is the central die spindle 58, the upper end of which, as indicated previously, provides the central mandrel for the ring-shaped die cavity. A lower ram member 54, which is a flanged hollow cylinder in shaped, and closely surrounds the die spindle 58, is immovably fixed relative to the press base 85, but relative movement between it and the ram member 6, the die body 52 and the die base 75 accomplishes the compaction of the ferrite material in the die cavity. The lower ram 54 closes the die cavity at the bottom thereof, and is secured to and supported by rods 82 which extend freely through clearance holes 71 in the die base 75 and have a shoulder 79 thereon which abuts the flange 81 of the lower ram member. At the other extremity of the rods 82, they are supported and secured to the fixed plate 84. The fixed plate 84 is firmly secured to the press base 85. Die base 75 is attached to and supported by rods 88 which pass through bearings 89 in the press base 85. Below the press base 85 the rods 88 are secured to the movable plate 91 by conventional means. The movable plate 91 is secured to cylindrical ram 95 for reciprocating vertical movement therewith.

In operation, the die cavity 53 is filled through the top of the cavity with the upper ram member in the withdrawn position. Alternatively, the die cavity may be filled through the filler opening 65 which passes through the die body 52 into the die cavity 53. After the filling of the die cavity is completed, the upper ram member 6 forces the die body 52 downward against the resistance provided by the cylindrical ram 95. As the ram 6 moves down, the die body 52, the bolts 72, the spacing members 73 and the die base 75 all move downwardly along the rod 82. The die spindle 58, which is fixed to the die base 75, also moves downwardly with the die body 52. The lower ram member 54 is stationary, since it is secured through flange 81, threaded bolts 78, and rods 82, to the fixed plate 84 and press base 85. The slurry or paste in the die cavity 53 is therefore subjected to increasing pressure between the downwardly moving upper ram member 6 and the stationary lower ram member 54. Simultaneously with the increase in pressure on the slurry, the coil 8 is energized and the ferromagnetic particles of the solid component of the slurry in the die cavity assume appropriate orientations in the magnetic field existing in the die cavity.

At the same time, high magnetic field gradients are established about the entrance to filtering paths 55, 57, 59 and 61. These filtering paths lead from the ring-shaped die cavity both circumferentially and centrally of the bottom surface of the upper ram member 6, and at the inner and outer circumference of the top surface of the lower ram member 54. The liquid component of the slurry is free to pass between the die body 52 and the upper ram member 6 along filtering path 55, between the upper surface of die spindle 58 and ram member 6 along filtering path 61 (through vacuum passage 68), between die body 52 and the lower ram member 54 along filtering path 57 and between the lower ram member 54 and the die spindle 58 along filtering path 59. The ferromagnetic particles of the slurry are held at the entrance to the filtering paths by the high magnetic field gradient which exists in these regions, thereby forming a mat of magnetic particles. As the ferromagnetic particles accumulate, the mat increases in size and particle density to a point at which it becomes fixed in place by the high friction forces between the ferromagnetic particles and thereby capable of resisting high compacting pressures.

In removing the green compact from the die cavity 53, the upper ram member 6 is moved upwardly to provide clearance over the die cavity. The downward travel of the die body 52 and the die base 75 is continued under the influence of ram cylinder 95, and thus the compact in the die cavity 53, which is resting on the upper surface of the lower ram member 54, is soon completely exposed for removal. A magnetic compact made in the press and die structure of FIG. 5 is illustrated in FIG. 6C.

Magnets have been produced in press and die structures made in accordance with this invention. In the following example one process which was used for making magnets is described in detail:

EXAMPLE

Modified strontium ferrite magnets are prepared essentially as described in U.S. Patent No. 3,113,927; that is, the following ingredients were thoroughly milled and mixed in a ball mill for six hours:

| | Pounds |
|---|---|
| $Fe_2O_3$ | 365.5 |
| $H_2O$ | 220 |
| Modified strontium carbonate | 68 |
| Sodium naphthaline sulphate | 6.5 |

The resulting slurry is dried in an Inconel rotary tube furnace at 2000° F. for about ten minutes and calcined in the same furnace for about 30 minutes at 2100° F. The calcined clinkers are pulverized in a disk pulverizer and 9,860 grams of the pulverized powder is ball milled for 68 hours with 11,260 grams of tap water and 222 grams of aluminum oxide powder. Large magnet bodies are pressed in a conventional filter press in a magnetic field and the resulting magnets are fired for 2 hours at 2200° F. The fired magnets are broken up and pulverized to −60 mesh size. The powder obtained is designated as ferrite A.

Lead ferrite powder is prepared by ball milling the following ingredients by weight for 3 hours in a ball mill:

|  | Parts |
|---|---|
| $Fe_2O_3$ powder | 2100 |
| PbO powder | 810 |
| $H_2O$ | 1600 |
| Sodium naphthalene sulphate | 30 |

The slurry is dried in an oven for 16 hours at 150° C. and the dried cake is calcined by passing it through an Inconel rotary tube furnace at 2050° F. The calcined clinkers were pulverized to −60 mesh size. This powder is designated as ferrite B.

The high temperature ferrite, ferrite A, is milled for one hour in a ball mill with the low temperature ferrite, ferrite B, and other ingredients in the following amounts:

| | | |
|---|---|---|
| Ferrite A | grams | 400 |
| Ferrite B | do | 100 |
| Water with 2% of sodium naphthaline sulphate | cc | 600 |
| Polyvinyl glycol | grams | 15 |

Magnets are pressed of this slurry in a die and coil assembly of the type shown in FIG. 1 of this invention. The magnets when pressed are 0.550 inch thick and 1.135 inch in diameter. The field gradient at the opening 15 is approximately 6000 oe./cm., the clearance between the die body 2 and the bottom plunger 4 is about 10 microns, and the average ferrite particle size is approximately 8 microns. The pressure versus time curve is approximately linear with the initial pressure at zero and the terminal pressure at 3000 p.s.i. Total pressing time is 60 seconds. The magnet exhibits a smooth pole face.

Despite the short pressing cycle, the relatively large opening the filtering path and the relatively small size of the ferrite particles, substantially no particles leaked out of the die cavity. The water flowed out readily. The particles were initially retained in the die cavity and prevented from escaping by the magnetic force which appeared superficially to be quite small for the average particle as compared to the clearance distances, but which was sufficiently large for the larger particles in the slurry.

Surprisingly, this magnetic force was found to be large enough to keep essentially all the magnetic particles in the die cavity. Further, the magnets were found to exhibit excellent magnetic properties because the particles were found to align very well in the pressing direction, the small volume portion of misaligned particles having virtually no effect.

There has thus been disclosed a magnetic filtering arrangement which is remarkably simple and economic in operation.

We claim as our invention:

1. In a press and die assembly having two ram members cooperating with a substantially non-magnetic die body with a die cavity therein for forming compacts from solid particle-liquid mixtures having a ferromagnetic particle constituent and a fluid non-magnetic constituent, at least one restricted filtering path between cooperating surfaces of a ram and the die body, the said filtering path having an opening communicating with the die cavity during compaction, means for establishing a high magnetic field gradient in the die cavity adjacent the filtering path, said means including a ferromagnetic insert in the wall of said die cavity, whereby the ferromagnetic constituent of the slurry is restrained against flow into the filtering path and a filtering mat of ferromagnetic particles is built up about the opening of the filtering path.

2. The press and die assembly of claim 1 including a first substantially ferromagnetic ram member capable of closing one end of the die cavity by abutment with the die body and a second substantially ferromagnetic ram member reciprocable relative to the die cavity for exerting pressure on the slurry therein and wherein the means for establishing a high magnetic field gradient includes an electromagnetic coil surrounding one of said ferromagnetic ram members.

3. The press and die assembly of claim 1, wherein at least one ram member has a knife-like magnetic edge in close proximity to said die wall.

4. The press and die assembly of claim 1, wherein at least one ram member has a non-magnetic insert therein.

5. The press and die assembly of claim 1 adapted to make ring-shaped compacts wherein a non-magnetic spindle is provided centrally of the die cavity and the second ram member is a hollow cylinder in form and surrounds said spindle, the spindle having a thin ferromagnetic insert therein forming an internal wall of the die cavity.

6. The press and die assembly of claim 2 adapted to make radially oriented magnets of arcuate cross-section which are rectangular in plan view, wherein shaping surface of the first ram member has a convex central portion with composite inserts of magnetic and non-magnetic materials forming shoulders at either side of the central portion, wherein the ferromagnetic insert in the die body closely abuts the magnetic portion of the composite inserts in the first ram member when the die cavity is closed, one filtering path lying between said inserts, and wherein the shaping surface of the second ram member is concave in form with the edges of the said second ram member providing knife-like portions which extend to a position closely adjacent the magnetic insert in the die body when the die cavity is closed by the ram members, another filtering path lying between the second ram member and the die body.

7. In the process of forming ferrite magnets in a press and die assembly having at least one filtering path between said press and die and which includes the press filtering of solid ferromagnetic particles from a non-magnetic fluid without the use of separate porous filtering elements, the improvement of steps comprising, confining a mixture of ferromagnetic particles and a non-ferromagnetic liquid in a press and die assembly adjacent at least one filtering path having an opening slightly larger than the largest magnetic particle, establishing a region of high magnetic field gradient adjacent the entrance to the filtering path, pressurizing the confined mixture to force the liquid to flow through said filtering path and maintaining said magnetic field gradient during said pressing, said pressurizing and magnetic field cooperating to form a filter mat of ferromagnetic materials by entrapping said particles adjacent the entrance to the filter path.

8. The method of claim 7 in which the effective length of the ferromagnetic particles in the direction of magnetization is given by the equation:

$$L \geq P/M \frac{dh_1}{du}$$

where P is the mechanical pressure in a given direction, M is the saturation magnetization of the ferromagnetic particle and $dh_1/du$ is the component of the field gradient in the direction opposite the direcaton of application of the mechanical pressure.

9. The method of claim 7 in which the field gradient is at least 6000 oe./cm. and the applied mechanical pressure starts at zero and increases substantially linearly to a value of about 3000 p.s.i.

10. The method of claim 9 in which such pressurization continues for up to about 60 seconds.

11. The method of claim 7 in which the ratio of the ferromagnetic particles in the solid particle-liquid mixture varies up to the consistency of a cake which may be preformed before filtering.

References Cited

UNITED STATES PATENTS 1,491,600  4/1924  Fernow _____ 210—222 X
3,085,291  4/1963  Haes et al. _____ 18—16.5

REUBEN FRIEDMAN, *Primary Examiner.*

J. L. DE CESARE, *Assistant Examiner.*

U.S. Cl. X.R.

18—16.5, 5; 25—45; 210—222; 264—111